(12) United States Patent
Brown et al.

(10) Patent No.: US 7,735,893 B2
(45) Date of Patent: Jun. 15, 2010

(54) OVERHEAD STORAGE COMPARTMENT FOR A VEHICLE

(75) Inventors: Gary Brown, Billericay (GB); Will Farrelly, Chelmsford (GB); Jonathan Young, Brighstone (GB); Daniel Edward Stanesby, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 11/857,604

(22) Filed: Sep. 19, 2007

(65) Prior Publication Data

US 2008/0106109 A1    May 8, 2008

(30) Foreign Application Priority Data

Sep. 21, 2006    (GB) .................................. 0618599.5

(51) Int. Cl.
*B60R 5/00*    (2006.01)
(52) U.S. Cl. ..................... 296/37.7; 296/37.1; 296/37.8; 224/309
(58) Field of Classification Search ................ 296/37.1, 296/37.7, 37.8, 24.34; 224/309, 311
See application file for complete search history.

(56) References Cited

U.S. PATENT DOCUMENTS 4,368,937 A  *  1/1983  Palombo et al. ............. 312/325
2002/0101090 A1    8/2002  Steingrebe et al.

FOREIGN PATENT DOCUMENTS

| DE | 738848 | 9/1943 |
|---|---|---|
| DE | 3721377 A1 | 1/1989 |
| DE | 102004005484 A1 | 1/2005 |
| GB | 381651 | 10/1932 |
| GB | 2416117 A | 1/2006 |

* cited by examiner

*Primary Examiner*—Lori L Lyjak
(74) *Attorney, Agent, or Firm*—Shook, Hardy & Bacon L.L.P.

(57) ABSTRACT

An overhead storage compartment (10, 100, 200) is disclosed in which the storage compartment (10, 100, 200) is moveable into a collapsed state so as to lie substantially adjacent to a roof panel (2) of a motor vehicle (5) and not intrude significantly into an interior space of the motor vehicle (5) and is further deployable from the collapsed state into an in-use or deployed state in which it defines a cavity that can be used to transport articles in the vehicle (5).

20 Claims, 8 Drawing Sheets

OVERHEAD STORAGE COMPARTMENT FOR A VEHICLE

TECHNICAL FIELD

This invention relates to vehicles and in particular to an overhead storage compartment for storing items within a vehicle.

BACKGROUND OF THE INVENTION

It is known from, for example, GB Patent Publication 2,416,117 to provide an overhead storage compartment for a motor vehicle.

Although such a storage compartment provides more storage space in a vehicle it is not always necessary to have the additional storage space provided and, particularly in the case of a vehicle used to transport passengers, the intrusion of the storage compartment into the interior of the vehicle can be inconvenient.

SUMMARY OF THE INVENTION

It is an object of this invention to provide an overhead storage compartment for a vehicle that can be stowed away when not required.

According to a first aspect of the invention there is provided an overhead storage compartment for a vehicle interior comprising at least one panel member for attachment to a roof panel of the motor vehicle wherein the at least one panel member is reversibly moveable from a first position in which it lies substantially adjacent to the roof panel so as not to intrude significantly into the interior of the motor vehicle and a second position in which it defines in combination with the roof panel and at least one other panel a cavity that can be used to transport one or more articles in the vehicle.

The at least one panel may comprise a base panel and the at least one other panel may comprise two end panels, wherein each of the end panels is pivotally connected at one edge to the roof panel and is pivotally connected at an opposite edge to the base panel so as to form in combination with the roof panel a four bar linkage.

When the base panel is in the first position, the two end panels may lie adjacent to the roof panel and when the base panel is in the second position the two end panels may depend downwardly from the roof panel.

At least one of the end panels may have a door hingedly connected thereto to facilitate access to the cavity formed when the base panel is in the second position.

The base panel may extend transversely across the roof panel of the vehicle.

The overhead storage compartment may extend across substantially the entire interior width of the vehicle.

Alternatively, the at least one panel member may comprise a first panel member pivotally connected at a first edge to the roof and the at least one other panel comprises a second panel member and a side panel of the motor vehicle wherein the second panel member is pivotally connected at a first edge to the side panel of the motor vehicle and the firs and second panels are pivotally connected together at respective second edges so as to form in combination with the roof panel and the side panel a three bar linkage.

When the first panel is in the first position, the second panel may lie in a first position adjacent to the side panel and, when the first panel is in its second position, the first panel may depend downwardly from the roof panel and the second panel may lie in a second position in which it extends inwardly from the side panel.

The compartment may further comprise first and second end members to close off the cavity formed when the first and second panels are in their respective second positions.

The first end member may be formed by a first upper triangular end panel connected to one end of the first panel for overlapping cooperation with a first lower triangular end panel connected to a corresponding end of the second panel when the first and second panels are in their respective second positions and the second end member may be formed by a second upper triangular end panel connected to the opposite end of the first panel for overlapping cooperation with a second lower triangular end panel connected to the corresponding end of the second panel when the first and second panels are in their respective second positions.

A biasing means may be provided to move the first and second upper triangular end panels to positions in which they lie flat on a rear side of the first panel when the first panel is in its first position and move the first and second lower triangular end panels to positions in which they lie flat on a rear side of the second panel when the second panel is in its first position.

As yet another alternative, the at least one panel comprises of a single bi-stable panel and the least one other panel comprises of a side panel of the motor vehicle, the bi-stable panel being connected at one end to the roof panel and being connected at an opposite end to the side panel of the motor vehicle, wherein the bi-stable panel has an outer surface which is concave when the bi-stable panel is in the first position so that a rear surface of the bi-stable panel lies substantially adjacent to the roof and side panels so as not to intrude significantly into the interior of the motor vehicle and, when the bi-stable panel is moved to a second position, the outer surface becomes convex so as to define in combination with the roof panel and the side panel a cavity that can be used to transport one or more articles in the vehicle.

The compartment may further comprise first and second end members to close off the cavity formed when the bi-stable panel is in its second position.

According to a second aspect of the invention there is provided a vehicle having an overhead storage compartment in accordance with said first aspect of the invention.

BRIEF DESCRIPTION OF THE DRAWINGS

The invention will now be described by way of example with reference to the accompanying drawing of which:—

DETAILED DESCRIPTION OF THE PREFERRED EMBODIMENTS

Figure 1:
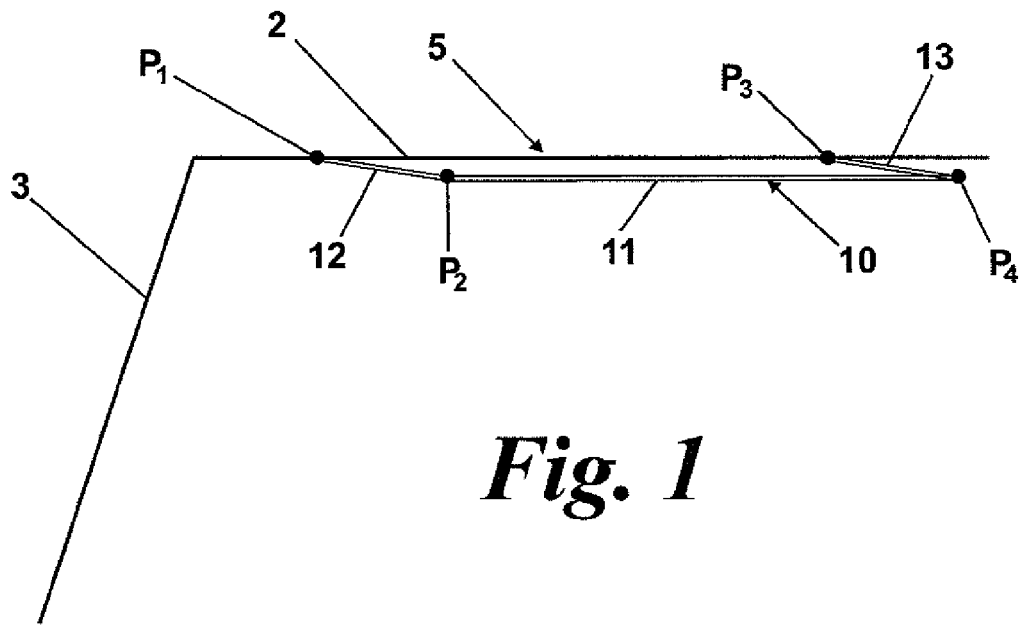
FIG. 1 is a schematic side view of an overhead storage compartment for a vehicle according to a first embodiment of the invention showing the storage compartment in a stowed state.

With particular reference to FIGS. 1 to 5 there is shown a first embodiment of an overhead storage compartment according to the invention in the form of a transversely arranged overhead storage compartment 10 fitted to a motor vehicle 5 having a roof panel 2, two side panels 4 and a rear end panel 3.

The overhead storage compartment 10 comprises a base panel 11 and two end panels 12, 13.

The first end panel 12 is a rear end panel and is pivotally connected at one edge by means of a hinge $P_1$ to the roof panel 2 of a motor vehicle 5 and is pivotally connected at an opposite edge by means of a second hinge $P_2$ to the base panel 11.

The second end panel 13 is a front end panel and is pivotally connected at one edge by means of a hinge $P_3$ to the roof panel 2 and is pivotally connected by means of a hinge $P_4$ at an opposite edge to the base panel 11.

The first and second end panels 12 and 13 and the base panel 11 form in combination with the roof panel 2 a four bar linkage allowing the base panel 11 to moved between stowed and deployed states.

Figure 4:
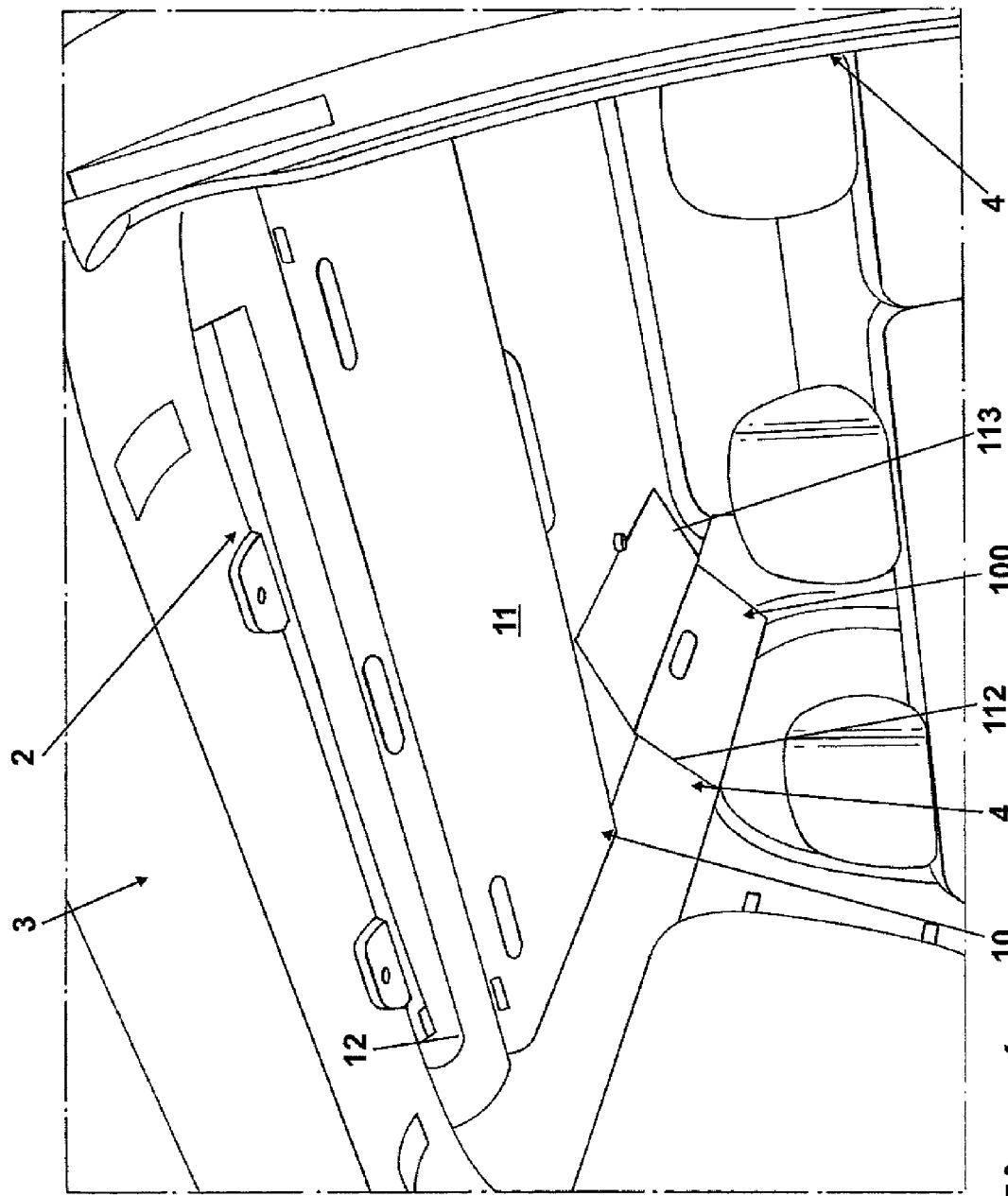
FIG. 4 is a pictorial view of the overhead storage compartment shown in FIGS. 1 to 3 in the stowed state as viewed from a rear end of the motor vehicle and also showing an overhead storage compartment for a vehicle according to a second embodiment of the invention in a stowed state.

When the base panel 11 is in a first position as shown in FIGS. 1 and 4, the two end panels 12, 13 lie adjacent to the roof panel 2 and the overhead storage compartment 10 is in its stowed state where it lies flush with the surrounding trim associated with the roof panel 2.

Figure 3:
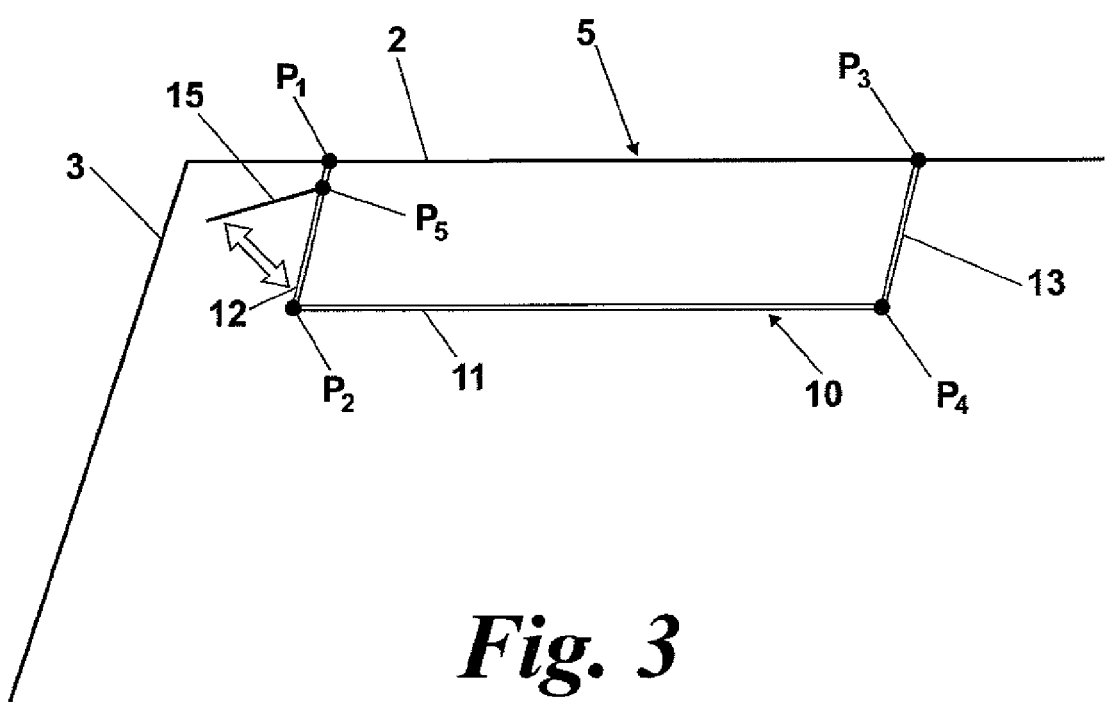
FIG. 3 is a schematic side view similar to that of FIG. 1 but showing the overhead storage compartment in a deployed state with an access door open.
Figure 5:
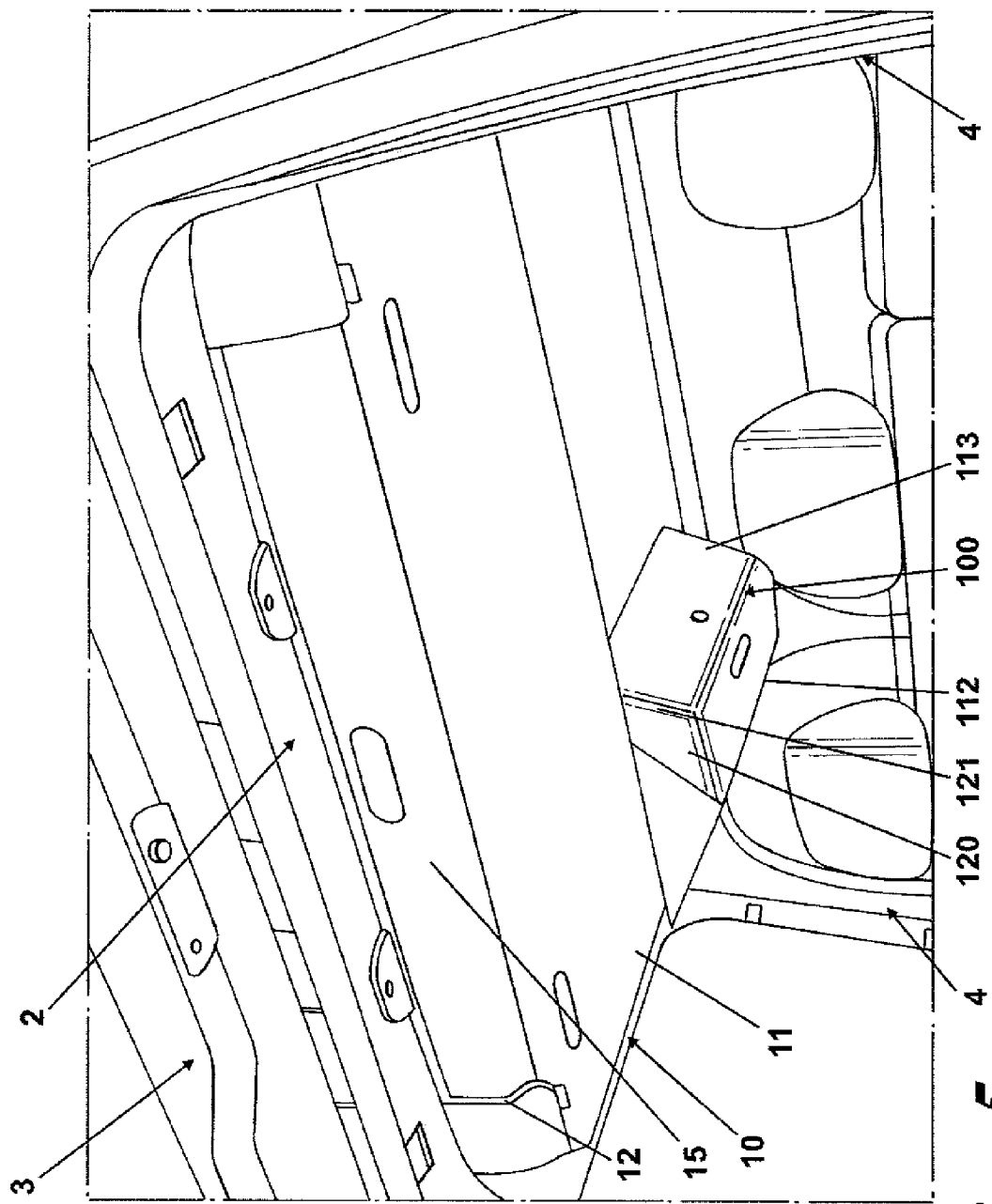
FIG. 5 is a pictorial view similar to that of FIG. 4 but showing the first and second embodiments of overhead storage compartment in their deployed states.
Figure 6:
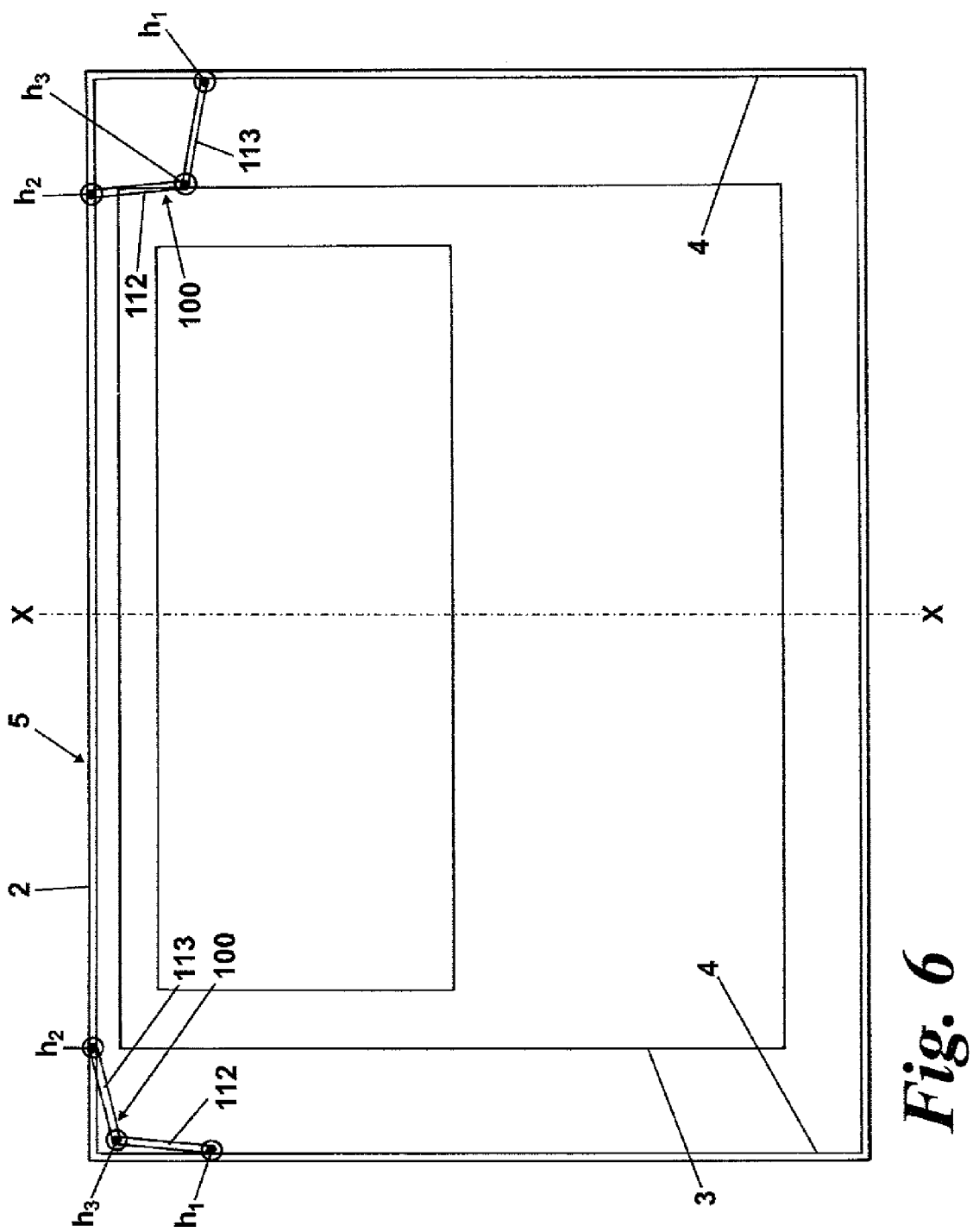
FIG. 6 is a schematic front view of the overhead storage compartment for a vehicle according to the second embodiment of the invention showing the storage compartment in a stowed state to the left of a vehicle centre-line X-X and in a deployed state to the right of the vehicle centre-line X-X.
Figure 7:
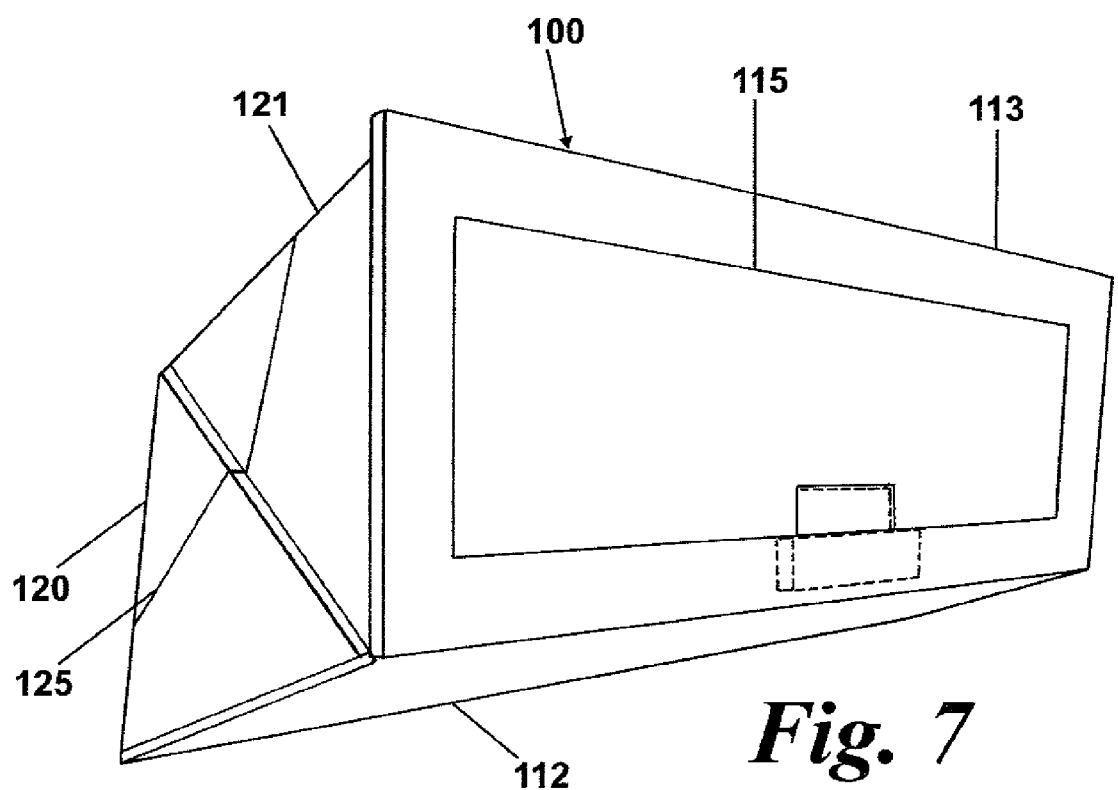
FIG. 7 is a pictorial view of the external surfaces of the overhead storage compartment according to the second embodiment in the deployed state.
Figure 8:
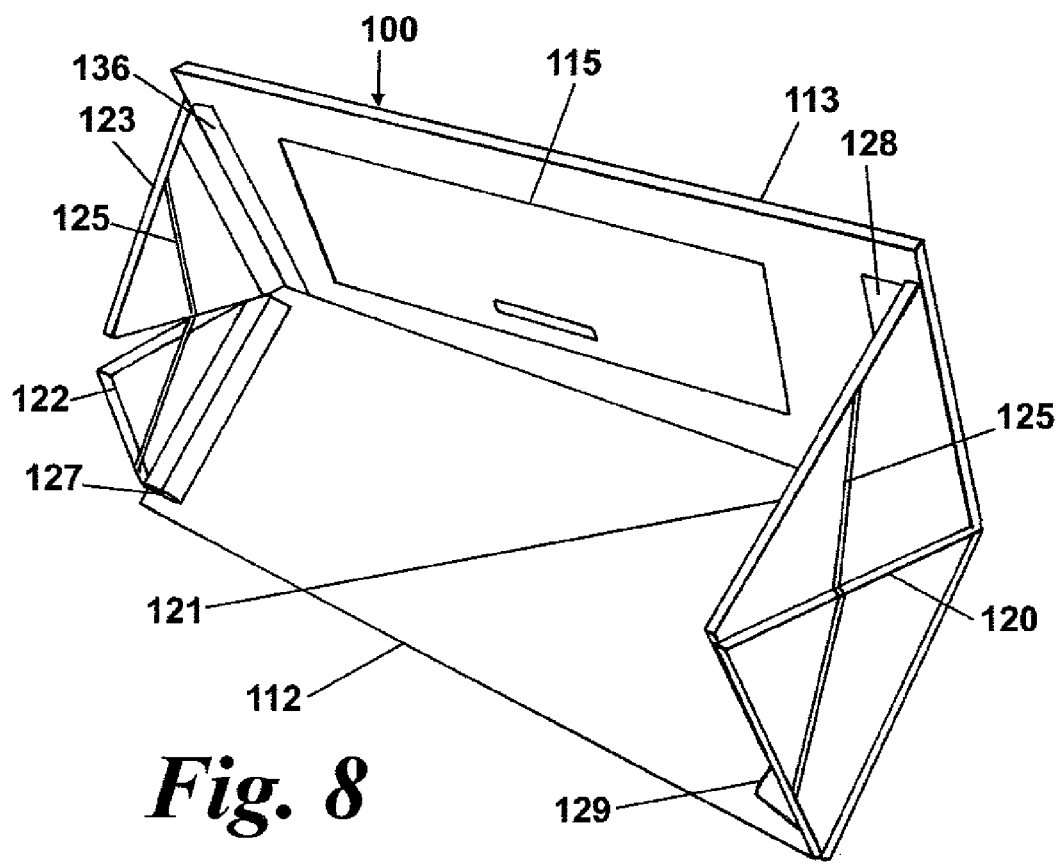
FIG. 8 is a pictorial view of the internal surfaces of the overhead storage compartment shown in FIG. 7.
Figure 9:
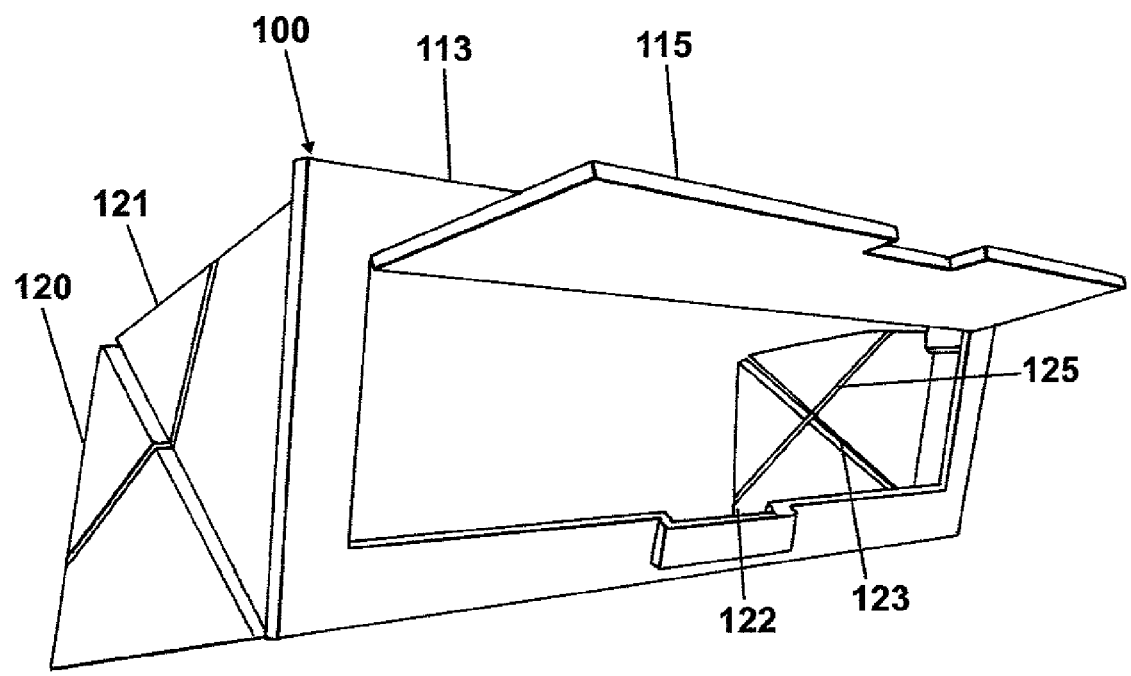
FIG. 9 is a pictorial view similar to FIG. 7 but showing an access door in an open position.

When the base panel 11 is in a second position, as shown in FIGS. 3 and 5, the first and second end panels 12, 13 depend downwardly from the roof panel 2 so that the base panel 11 is spaced away from the roof panel 2 and the overhead storage compartment 10 is in its deployed state.

In the deployed state, the base panel 11 forms in combination with the first and second end panels 12, 13 and the roof panel 2 a cavity which can be used to transport articles in the vehicle 5. In the deployed state the overhead storage compartment 10 intrudes considerably into the interior of the motor vehicle 5 and so this state is normally only used when it is required to transport one or more articles therein.

The first end panel 12 has a door 15 hingedly connected thereto to facilitate access to the cavity formed when the overhead storage compartment 10 is in its deployed state.

As can best be seen with reference to FIGS. 4 and 5 the base panel 11 extends transversely across the roof panel 2 of the vehicle 5 and the overhead storage compartment 10 extends across substantially the entire interior width of the vehicle 5. That is to say it extends between one side panel 4 and the opposite side panel 4.

Figure 2:
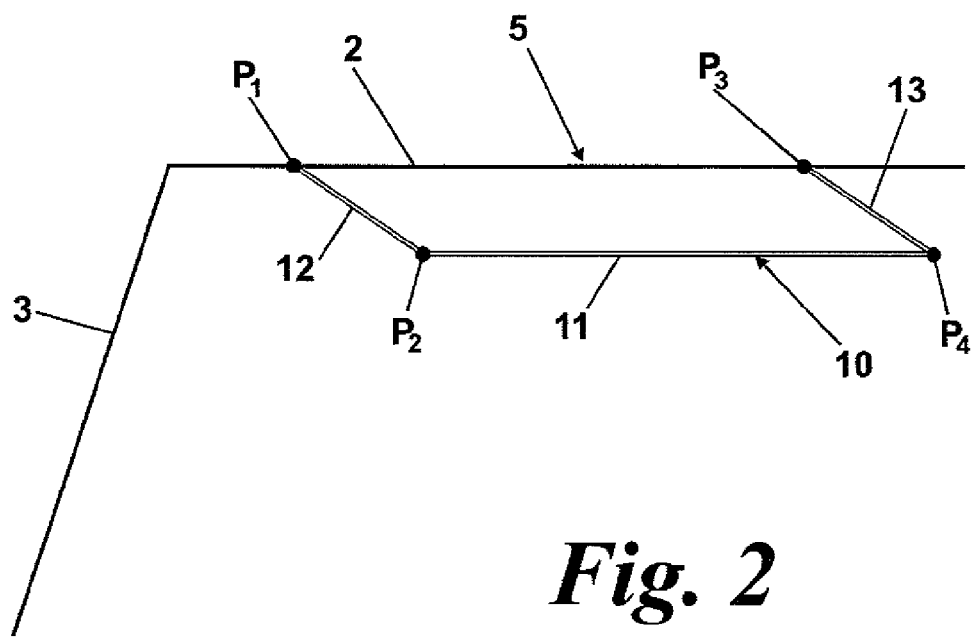
FIG. 2 is a schematic side view similar to that of FIG. 1 but showing the overhead storage compartment in a partially deployed state.

Operation of the overhead storage compartment 10 is as follows. From the stowed state as shown in FIGS. 1 and 4 latches (not shown) are released allowing the first and second end panels 12 and 13 to rotate relative to the base panel 11 and the roof panel 2. This allows the base panel 11 to swing away from the roof panel 2, as shown in FIG. 2. The base panel 11 moves downwardly and rearwardly as it traverses from the stowed state to the deployed state.

When the base member 11 reaches the second position in which the overhead storage compartment is in the deployed state further latches engage to hold it in this position.

To gain access to the cavity formed within the deployed overhead stowage compartment 10, a catch (not shown) holding the door 15 is released allowing the door 15 to be opened.

It will be appreciated that, to move the overhead storage compartment 10 back to the stowed state, the latches holding the base panel 11 in the deployed state are released and the base panel 11 is pushed upwardly and forwardly until the latches used to hold the base panel 11 in the stowed state re-engage.

Therefore an overhead storage compartment is provided in accordance with this embodiment that permits articles to be stored in it when it is in a deployed state but when not required for storage purposes can be conveniently stowed so as not to intrude on the interior space within the vehicle.

With particular reference to FIGS. 4 to 10 there is shown a second embodiment of overhead storage compartment according to the invention in the form of a side mounted overhead storage compartment 100 fitted to the motor vehicle 5. The motor vehicle 5 has, as before, a roof panel 2, a rear panel 3 and two side panels 4.

The overhead storage compartment 100 comprises a first panel member 113 pivotally connected at a first edge by means of a hinge $h_2$ to the roof panel 2 and a second panel member 112 pivotally connected by means of a hinge $h_1$ at a first edge to the side panel 4 of the motor vehicle 5.

The first and second panels 113 and 112 are made from a rigid resilient plastic material and are pivotally connected together at respective second edges by means of a common hinge $h_3$ so as to form in combination with the roof panel 2 and the side panel 4 a three bar linkage. It will be appreciated that the first and second panels 113 and 112 could be made from other materials and that the invention is not limited to the use of a rigid resilient plastic material.

When the first panel 113 is in a first position it lies adjacent the roof panel 2 and the second panel 112 lies in a corresponding first position adjacent to the side panel 4. When the first and second panels 113 and 112 are in their respective first positions, the overhead storage compartment 100 is in the stowed state (as shown to the left-hand side of the vehicle centreline X-X on FIG. 6 and in FIGS. 4 and 10) and it lies substantially flush with the trim surrounding it.

When the first panel 113 is in a second position it depends or extends downwardly from the roof panel 2 and the second panel 112 also lies in a second position in which it extends inwardly from the side panel 4 to which it is pivotally connected. That is to say, the second panel 112 extends towards the centreline X-X of the motor vehicle 5. When the first and second panels 113 and 112 are in their respective second positions, the overhead storage compartment 100 is in the deployed state and it projects outwardly from the trim surrounding it so as to define a storage cavity (as shown to the right-hand side of the vehicle centreline X-X on FIG. 6, in FIG. 5 and in FIGS. 7 to 9)

The first panel 113 has a hatch or door 115 fitted in it to provide access to the cavity formed when the overhead storage compartment 100 is in its deployed state.

To prevent articles falling out of the ends of the overhead storage compartment 100 when it is in its deployed state first and second end members are provided to close off the cavity formed when the first and second panels 113 and 112 are in their respective second positions. The first and second ends could be formed from fabric or other flexible material that can fold up to allow the overhead stowage compartment to be stowed. However, in the embodiment shown, the first end comprises a first upper triangular end panel 121 made from a rigid plastic material connected to one end of the first panel 113 and a first lower triangular end panel 120 made from a rigid plastic material connected to a corresponding end of the second panel 112 and the second end member is formed by a second upper triangular end panel 123 made from a rigid plastic material connected to the opposite end of the first panel 113 and a second lower triangular end panel 122 made from a rigid plastic material connected to the corresponding end of the second panel 112.

It will be appreciated that the end panels 120, 121, 122, 123 could be made from other materials and that the invention is not limited to the use of a rigid resilient plastic material.

When the first and second panels 113, 112 are in their respective second positions, the first lower triangular end panel 120 overlaps the first upper triangular end panel 121 so as to cooperate therewith to form an end wall and the second lower triangular end panel 122 overlaps the second upper triangular end panel 123 so as to cooperate therewith to form an end wall.

Figure 10:
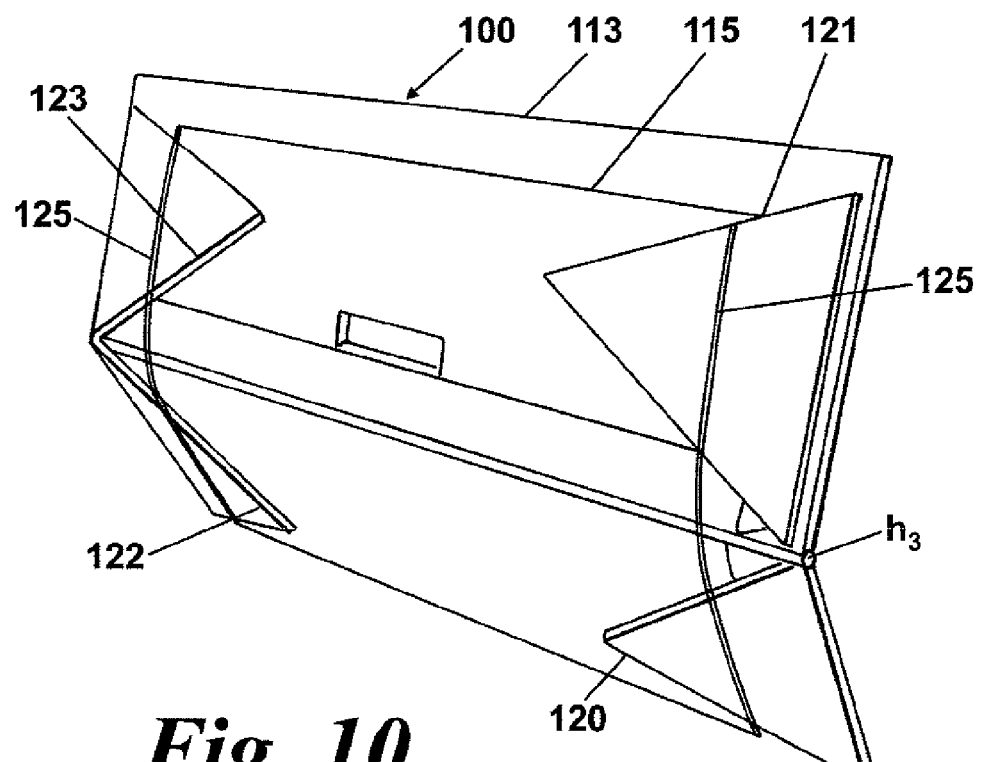
FIG. 10 is a pictorial view of the internal surfaces of the overhead storage compartment shown in FIG. 8 when the overhead storage compartment is in the stowed position.

As can best be seen in FIG. 10, a biasing means which in this case is in the form of an elastic strap 125 is provided to move the first and second upper triangular end panels 121, 123 to positions in which they lie flat on a rear side of the first panel 113 when the first panel 113 is in its first position and move the first and second lower triangular end panels 120, 122 to positions in which they lie flat on a rear side of the second panel 112 when the second panel 112 is in its first position.

Therefore, when the overhead storage compartment 100 is in the stowed state, the first and second upper triangular end panels 121, 123 lie flat between the rear side of the first panel 113 and the roof panel 2 and the first and the second lower triangular end panels 120, 122 lie flat between the rear side of the second panel 112 and the side panel 4 of the motor vehicle 5.

Operation of the overhead storage compartment 100 is as follows. From the stowed state (as shown in FIGS. 4, 10 and on the left hand side of FIG. 6) latches (not shown) are released allowing the first and second panels 113 and 112 to rotate relative to the side panel 4 and the roof panel 2. This allows the first panel 113 to swing away from the roof panel 2 and the second panel 112 to swing away from the side panel 4. Although not shown at least one of the hinge means $h_1$, $h_2$ connecting the second panel 112 and the first panel 113 to the side panel 4 and the roof panel 2 includes a means to permit not only pivotal movement but translational movement. This is required because the distance between the hinges $h_1$, $h_2$ is less when the overhead storage compartment 100 is in its stowed and deployed positions than the combined width of the first and second panels 113, and 112 and during the transition between the stowed and deployed positions the first and second panels 113 and 112 become aligned. It will therefore be appreciated that, without some means of translational movement in at least one of the hinge means $h_1$, $h_2$, operation of the overhead storage compartment 100 would not be possible.

When the first and second panels 113 and 112 reach their respective second positions in which the overhead storage compartment 100 is in the deployed state further latches (not shown) engage to hold it in this position.

To gain access to the cavity formed within the deployed overhead stowage compartment 100, a catch holding the door 115 can be released allowing the door 115 to be opened.

It will be appreciated that, to move the overhead storage compartment 100 back to the stowed state, the latches holding the first and second panels 113 and 112 in the deployed state are released and the first and second panels 113 and 112 are pushed upwardly and outwardly with respect to the centreline X-X of the motor vehicle 5 in the region of the hinge $h_3$ until the latches used to hold the first and second panels 113 and 112 in the stowed state re-engage.

Therefore an overhead storage compartment is provided in accordance with this embodiment that permits articles to be stored in it when it is in a deployed state but when not required for storage purposes can be conveniently stowed so as not to intrude on the interior space within the vehicle.

Figure 11:
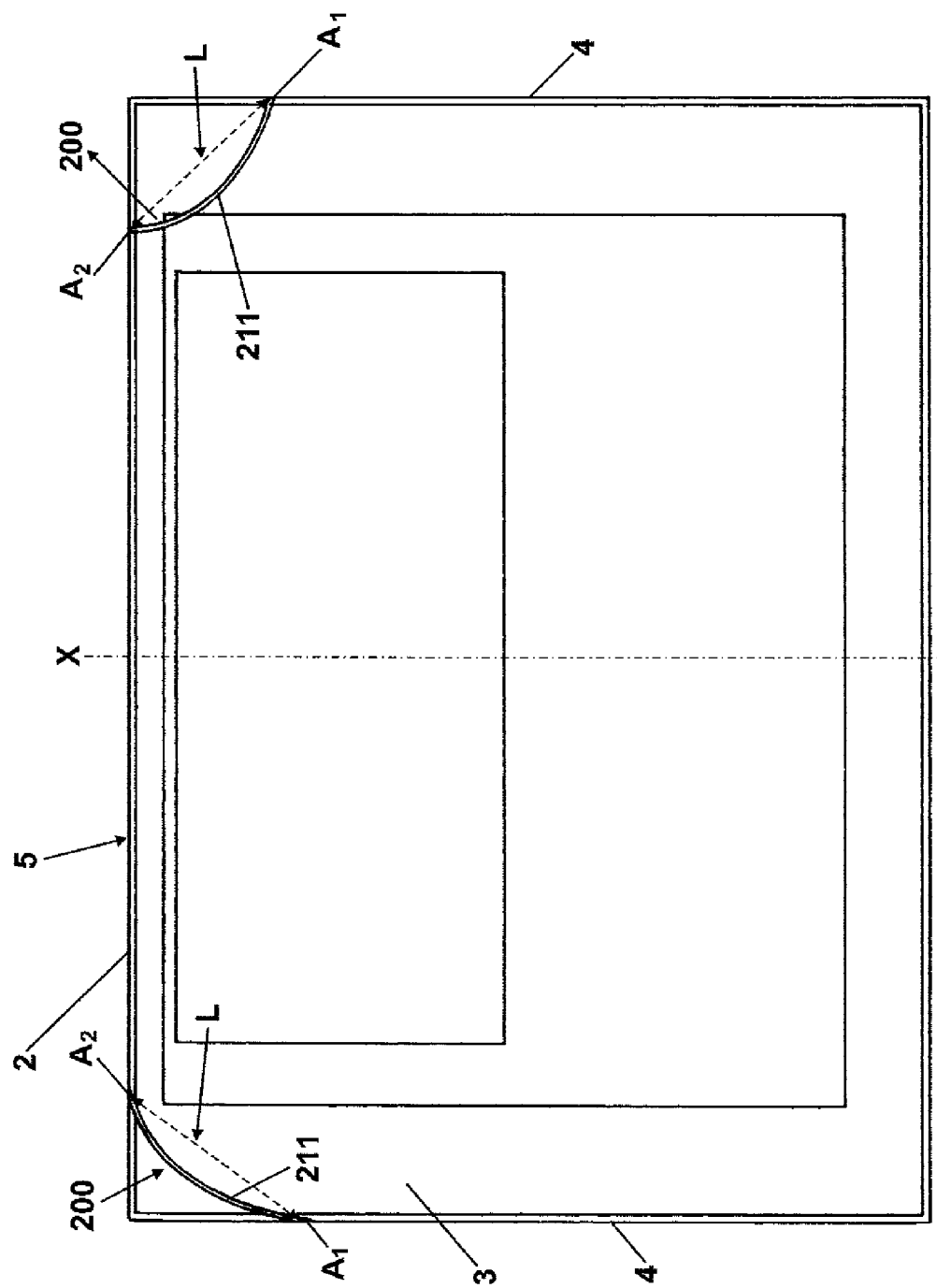
FIG. 11 is a schematic side view of an overhead storage compartment for a vehicle according to a third embodiment of the invention showing the storage compartment in a stowed state to the left of the vehicle centre-line X-X and in a deployed state to the right of the vehicle centre-line X-X.

With reference to FIG. 11 there is shown a third embodiment of overhead storage compartment according to the invention in the form of a side mounted overhead locker 200 fitted to the motor vehicle 5 which can be used as a direct replacement for the side mounted overhead storage compartment 100 described with respect to the second embodiment of the invention. The motor vehicle 5 has, as before, a roof panel 2, a rear panel 3 and two side panels 4.

The overhead storage compartment 200 is formed by a single bi-stable curved panel 211 which is attached along one edge by a first attachment means $A_1$ to the roof panel 2 and is attached along an opposite edge by a second attachment means $A_2$ to one of the side panels 4. The bi-stable panel 211 is in the form of part of a cylindrical shell. The mechanisms employed in this embodiment to obtain a bi-stable effect are explained in greater detail in a paper entitled "Bistable Pre-stressed Shell Structures" by E. Kebadze, S. D. Guest and S Pellegrino of the Department of Engineering, University Of Cambridge Trumpington Street, Cambridge, CB2 1PZ, UK.

The attachment means $A_1$ allows the edge of the bi-stable panel 211 to rotate relative to the roof panel 2 and the attachment means $A_2$ allows the edge of the bi-stable panel 211 to rotate relative to the side panel 4. The chord length "L" between the attachment means $A_1$ and $A_2$ is less than the width of the bi-stable panel 211 when it is flat so that it is only stable when in a curved form.

The bi-stable panel 211 is stable in a first position (shown to the left hand side of the centreline X-X of the motor vehicle 5) in which an outer surface of the bi-stable panel 211 is concave so that a rear surface of the bi-stable panel 211 lies substantially adjacent to the roof panel 2 and the side panel 4 of the motor vehicle. This first position forms a stowed state of the overhead locker 200 and in this stowed state the overhead locker 200 does not to intrude significantly into the interior of the motor vehicle 5.

The bi-stable panel 211 is also stable in a second position (shown to the right hand side of the centreline X-X of the motor vehicle 5). In this second position the outer surface of the bi-stable panel 211 becomes convex and the rear side of the bi-stable panel 211 defines in combination with the roof panel 2 and the side panel 4 of the motor vehicle 5 a cavity. In this second position the overhead locker 200 is in a deployed state and the cavity can be used to transport one or more articles in the vehicle 5.

Fabric end covers (not shown) are attached to the opposite ends of the bi-stable panel so as to prevent articles from falling out of the cavity. At least one of the end covers is releasable secured so that it can be partially removed to allow articles to be placed in or removed from the cavity.

Operation of the overhead storage compartment is by pulling on the bi-stable panel 211 to move it from the stowed state to the deployed state or pushing on the bi-stable panel 211 to move it from the deployed state to the stowed state. A handle (not shown) may be provided to assist with these movements.

Although the invention is applicable to all road vehicles it will be appreciated that it is particularly advantageous for passenger carrying motor vehicle having limited interior space such as SUV's, estate cars, hatchbacks and MPV's.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention.

The invention claimed is:

1. An overhead storage compartment for a vehicle interior comprising a base panel member for attachment to a roof panel of the motor vehicle and two end panels each of which is pivotally connected at one edge to the roof panel and is pivotally connected at an opposite edge to the base panel so as to form in combination with the roof panel a four bar linkage wherein the base panel member is reversibly moveable from a first position in which it lies substantially adjacent to the roof panel so as not to intrude significantly into the interior of the motor vehicle and a second position in which it defines in combination with the roof panel and the two end panels a cavity that can be used to transport one or more articles in the vehicle.

2. A compartment as claimed in claim 1 in which, when the base panel is in the first position, the two end panels lie adjacent to the roof panel and when the base panel is in the second position the two end panels depend downwardly from the roof panel.

3. A compartment as claimed in claim 1 in which at least one of the end panels has a door hingedly connected thereto to facilitate access to the cavity formed when the base panel is in the second position.

4. A compartment as claimed in claim 1 in which the base panel extends transversely across the roof panel of the vehicle.

5. A compartment as claimed in claim 1 in which the overhead storage compartment extends across substantially the entire interior width of the vehicle.

6. A vehicle having an overhead storage compartment as claimed in claim 1.

7. A compartment as claimed in claim 2 in which at least one of the end panels has a door hingedly connected thereto to facilitate access to the cavity formed when the base panel is in the second position.

8. A compartment as claimed in claim 2 in which the base panel extends transversely across the roof panel of the vehicle.

9. A compartment as claimed in claim 3 in which the base panel extends transversely across the roof panel of the vehicle.

10. A compartment as claimed in claim 2 in which the overhead storage compartment extends across substantially the entire interior width of the vehicle.

11. A compartment as claimed in claim 3 in which the overhead storage compartment extends across substantially the entire interior width of the vehicle.

12. A compartment as claimed in claim 4 in which the overhead storage compartment extends across substantially the entire interior width of the vehicle.

13. A vehicle having an overhead storage compartment as claimed in claim 2.

14. A vehicle having an overhead storage compartment as claimed in claim 3.

15. A vehicle having an overhead storage compartment as claimed in claim 4.

16. A vehicle having an overhead storage compartment as claimed in claim 5.

17. A compartment as claimed in claim 1 in which, when the base panel is in the first position, the two end panels lie adjacent to the roof panel and when the base panel is in the second position the two end panels depend downwardly from the roof panel, and wherein at least one of the end panels has a door hingedly connected thereto to facilitate access to the cavity formed when the base panel is in the second position, said base panel extending transversely across the roof panel of the vehicle.

18. A compartment as claimed in claim 1 in which, when the base panel is in the first position, the two end panels lie adjacent to the roof panel and when the base panel is in the second position the two end panels depend downwardly from the roof panel, and wherein at least one of the end panels has a door hingedly connected thereto to facilitate access to the cavity formed when the base panel is in the second position, said overhead storage compartment extending across substantially the entire interior width of the vehicle.

19. A compartment as claimed in claim 1 in which, when the base panel is in the first position, the two end panels lie adjacent to the roof panel and when the base panel is in the second position the two end panels depend downwardly from the roof panel, and wherein at least one of the end panels has a door hingedly connected thereto to facilitate access to the cavity formed when the base panel is in the second position, said overhead storage compartment extending across substantially the entire interior width of the vehicle and said base panel extending transversely across the roof panel of the vehicle.

20. A vehicle having an overhead storage compartment as claimed in claim 1 and further in which, when the base panel is in the first position, the two end panels lie adjacent to the roof panel and when the base panel is in the second position the two end panels depend downwardly from the roof panel, at least one of the end panels has a door hingedly connected thereto to facilitate access to the cavity formed when the base panel is in the second position.

\* \* \* \* \*